Oct. 1, 1968   M. MAYRATH   3,403,774
SNAP-OVER BELT TIGHTENER FOR CONVEYORS
Filed Dec. 14, 1966
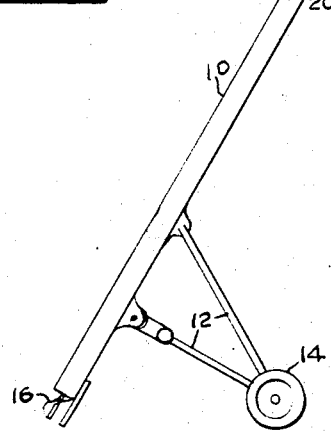
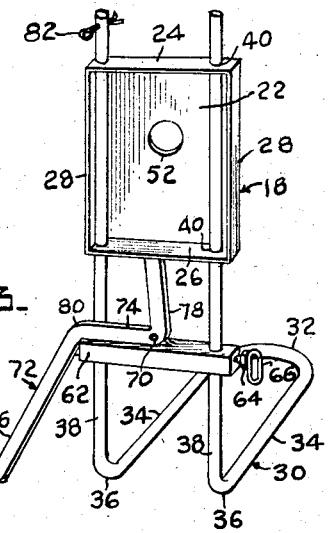
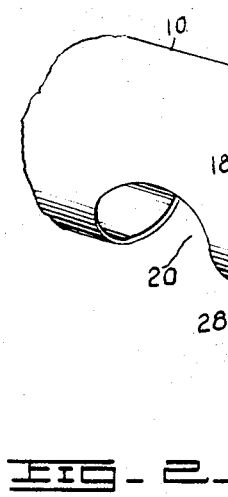
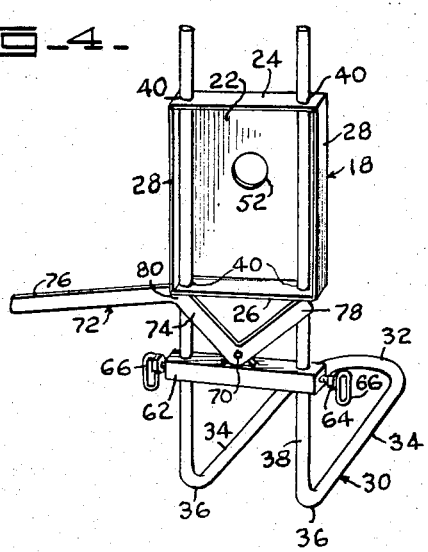
INVENTOR
MARTIN MAYRATH
BY Homer R. Montague
ATTORNEY

United States Patent Office 3,403,774
Patented Oct. 1, 1968

3,403,774
SNAP-OVER BELT TIGHTENER FOR CONVEYORS
Martin Mayrath, 10707 Lennox Lane,
Dallas, Tex. 75229
Filed Dec. 14, 1966, Ser. No. 601,749
5 Claims. (Cl. 198—213)

ABSTRACT OF THE DISCLOSURE

A belt-adjusting and clutching arrangement for an auger conveyor of the type that has a head box on the drive end of the auger tube, and a drive-motor mounted on rails slidable in the head box, with a belt connecting respective pulleys on the auger shaft and the motor shaft. A cross bar adjustably clamped on said rails supports a cranked lever whose stable end positions control the pulley spacing at the limits of a selected range.

---

This invention has to do with conveyors of the power driven type such as are widely employed as grain loaders, feed handling devices and the like, and especially to such conveyors as employ a rotary auger for the conveying element. Auger conveyors are manufactured in a wide variety of types and sizes, some being mounted on wheeled frameworks, others being relatively stationary (though physically movable) installations such as in truck and silo loaders, etc. It is often advantageous to provide a mounting means for the motor, engine or other prime mover, directly suspended from the auger tube or casing, rather than carried as a separate device on a supporting framework or welded carriage.

In my prior Patent No. 3,236,364, granted Feb. 22, 1966, I have disclosed such an auger conveyor embodying two types of mountings for the prime movers for the conveyors, one being mounted on a bracket intermediate the length of the conveyor tube and having belt connection with the conveyor auger to drive the latter. The other mounting in the prior patent referred to provides a pulley on the end of the conveyor auger, and a motor is mounted adjacent said pulley to effect the direct driving thereof. The motor in this case is mounted on the bent looped end of a support of "hairpin" construction formed of a bar or one-piece tubing. The arms of the support remote from the looped end thereof are bent to slidably extend through a head box mounted on the discharge end of the conveyor tube. The belt connected between the driving motor and the pulley is tensioned by moving the looped end of the support away from the drive pulley and fixing it in position with respect to the head box.

The present invention has for its principal object the provision of simple and novel means for adjusting the tension of the driving belt from the motor to the auger pulley, a very simple operation of such device serving to relieve the tension of the belt and thus serving to "unclutch" the motor from the auger pulley.

A further object is to provide motor supporting means of the character referred to wherein the parallel arms of the motor mount which are slidable through the head box, carry a cross member having lever means associated therewith for camming such member away from the head box to tension the belt, the lever means being movable to release the camming means and thus place slack in the driving belt to "unclutch" the motor from the pulley when desired.

The above and other objects and advantages of the invention will best be understood from a consideration of the following detailed specification of a preferred embodiment of the invention taken in connection with the appended drawing, in which:

FIGURE 1 is a small-scale view of a typical conveyor or grain loader illustrating the general environment of the headbox and the elements associated therewith;

FIGURE 2 is a perspective view, to a larger scale, showing the principal parts of the construction, portions of the conveyor tube being broken away;

FIGURE 3 is a perspective view showing the inner said of the headbox with the motor supporting means and belt-tension adjusting means shown in their relationship to the headbox, parts being omitted and the tension adjusting device being shown in belt tensioning position; and FIGURE 4 is a similar view showing the tension adjusting means and associated parts in belt-tension relieving positions.

FIGURE 1 shows the general environment of the invention as applied to a wheeled grain loader or similar conveyor, including the auger tube 10 supported by bars 12 having ground wheels 14. The usual conveyor auger 16 is arranged in the tube 10 and the latter is provided at its upper end with a headbox 18, below which the tube 10 is provided with a discharge opening 20.

The headbox 18 may be identical with that shown in my prior Patent No. 3,236,364 referred to above, the headbox having a main wall 22, top and bottom walls 24 and 26 and side walls 28. The upper end of the tube 10 is received in the open face of the headbox 18 and secured thereto in any suitable manner, for example, as shown in my prior patent referred to.

A motor support indicated as a whole by the numeral 30 is employed, and this support may be substantially identical with the support shown in FIGURE 3 of the prior patent referred to. This support is made a one-piece tube or bar looped intermediate its ends as at 32, and arms 34 extending from such loop are bent as at 36 to extend upwardly, as viewed in FIGURES 2, 3 and 4, as parallel rails or arms 38. These arms extend upwardly through openings 40 in the box walls 24 and 26, the free ends of the arms 38 extending upwardly above the wall 24 in any adjusted positions of the parts.

The arms 34 form a platform to support a motor 42 having feet 44 fixed as at 46 to clamping members 48 engageable against opposite sides of the arms 34, this motor mounting being shown in my prior patent referred to above.

The auger 16 includes a drive shaft 50 extending through an opening 52 in the headbox wall 22, and in such opening is arranged a bearing 54 (FIGURE 2) for the shaft 50. Means is provided for driving the shaft 50 from the motor 42 by a flexible driving element, and preferably a V-belt 56. This belt passes around a pulley 58 on the motor shaft and around a pulley 60 mounted on the shaft 50.

A cross-head 62 of preferably square or channel cross section is mounted on the support arms 38. The ends of the cross-head 62 are closed and each carries a set screw 64, having an operating handle 66, engageable with the support arms 38 to clamp the cross-head 62 in adjusted positions.

Centrally of the top face of the cross-head 62 (FIGURE 2) an ear 68 is welded to the cross-head and carries a pivot pin 70 for pivotally connecting it to the center of a bell crank lever indciated as a whole by the numeral 72. The longer end of the lever 72 comprises arms 74 and 76, bent at an angle with respect to each other, and the arm 74 is engageable with the top of the cross-head 62 when the parts are in the belt-tightening position shown in FIGURE 3. The other arm 78 of the lever 72 is shorter and has its upper end engageable with the bottom of the wall 26 in the belt-tightening position of the parts. In the belt-releasing position of the parts, the free end of the lever 78 engages the wall 26 adjacent one end thereof, and the other end portion of such wall is engaged by the bend 80 in the lever 72 between the arms 74 and 76. A cotter pin 82 or the like at the top of one of rods 38 may be provided as a safety provision if the belt should break.

*Operation*

The motor 42 drives the pulley 60 and hence the auger shaft 50 to feed grain or other material from the open lower end of the tube 10 to be discharged through the opening 20.

The lever 72 and associated parts form a simple and easily operable means for tensioning the belt 56 during a driving operation and to relieve the tension of the belt when it is desired to "unclutch" the motor 42 from the pulley 60. The belt 56 may be subject to variations in its length due to age, tension, etc. Whenever the lever 72 is swung to the position shown in FIGURE 3, the cross head 62 and the motor mount 30 are forced downwardly relative to the headbox 28 to tension the belt for driving. It will be noted that when the lever 72 is swung in such position, the arm 78 moves slightly past center so that the tension of the belt tends to maintain the parts in operative position. If, when the lever 72 has been so operated, the belt 76 is not sufficiently tight, the lever may be swung to the position shown in FIGURE 4 to relieve tension on the belt, whereupon the screws 64 are loosened, the cross head 62 is raised in FIGURES 2, 3 and 4 to some extent, and the screws 64 are tightened. The lever 72 then may be moved to the belt tensioning position shown in FIGURE 3 to tension the belt for the conveyor driving operation.

When it is desired to "unclutch" the motor from the conveyor, the lever arm 76 is swung upwardly to the position shown in FIGURE 4, whereupon the end 78 of the lever arm 72 will be swung downwardly a sufficient distance to relieve the belt tension. The bend 80 in the lever 72 will engage the bottom of the box wall 26 opposite the point of engagement of the lever end 78 therewith, thus limiting turning movement of the lever. The belt 56 will now be relaxed and the motor is free to operate without driving the conveyor.

It will be apparent that the present invention provides an extremely simple means for tensioning or relieving the tension in the belt of the motor driving means of my prior patent and employing the motor support 30. Stretching or other variations in the belt length may be compensated for, and the belt may be very quickly properly tensioned for the driving operation, or the tension of the belt may be relieved to disconnect the motor from the conveyor.

It will be seen that the construction accomplishes the objects of the invention in a very simple, economical and efficient way, but it will also be appreciated that the construction can be varied, as to details, without departing from the scope of the invention, which scope is defined in the appended claims.

What is claimed is:

1. In an auger conveyor of the type having an auger, an auger shaft and an auger tube, a headbox mounted on one end of said auger tube, a motor supporting unit slidably supported by said headbox for movement perpendicular to the axis of said shaft, a pulley on said shaft, a motor fixed to said motor supporting unit and having a drive pulley, a belt passing around said pulleys, a bar adjustably clamped to said supporting unit, and a snap-over lever pivoted on said bar with one end engaging said headbox to exert a force thereagainst to create a reaction tending to move said motor supporting unit away from said headbox to tighten said belt.

2. An auger conveyor according to claim 1 wherein said supporting unit comprises parallel rails slidable through said headbox, and said bar forms a cross head between the rails.

3. An auger conveyor according to claim 2 wherein said lever is of the bell crank type and is pivotedly supported at its angle on said cross head intermediate the length thereof, said bell crank lever having one arm engageable against said headbox to exert said force thereagainst, said lever having a second arm lying against said cross head when said first arm is in full belt-stretching engagement with said headbox.

4. An auger conveyor according to claim 2 wherein said lever is of the bell crank type and is pivotedly supported at its angle on said cross head intermediate the length thereof, said bell crank lever having one arm engageable against said headbox to exert said force thereagainst, said lever having a second arm lying against said cross head when said one arm is in full belt-stretching engagement with said headbox, said one lever arm, in engagement with said headbox, moving over center when said second lever arm engages said cross-head whereby said force against said headbox and its reactionary force tend to hold said lever in belt-tightening position.

5. An auger conveyor according to claim 2 wherein said second lever arm is provided with a bend, the free end of said second arm being adapted to serve as a lever handle, the bend in said lever engaging said headbox in the belt-loose position, to limit turning movement of said lever, while said one arm of said lever remains in engagement with said headbox.

References Cited

UNITED STATES PATENTS 2,413,265 12/1946 Thompson _____ 198—208
3,236,364 2/1966 Mayrath _____ 198—233

RICHARD E. AEGERTER, *Primary Examiner.*